United States Patent [19]

Sewell

[11] Patent Number: 5,139,842
[45] Date of Patent: Aug. 18, 1992

[54] DUNNAGE DEVICE

[76] Inventor: James D. Sewell, 5005 Yarrow Ct., Fair Oaks, Calif. 95628

[21] Appl. No.: 709,853

[22] Filed: Jun. 4, 1991

[51] Int. Cl.⁵ ............................................... B32B 3/12
[52] U.S. Cl. .................................... 428/116; D9/456; 410/154; 410/155; 428/12
[58] Field of Search ................... 428/116, 12, 118, 73; 160/84.1; 156/197; D9/456; 410/154, 155

[56] References Cited

U.S. PATENT DOCUMENTS

| | | | |
|---|---|---|---|
| 3,103,460 | 9/1963 | Picket | 428/118 |
| 3,593,671 | 7/1971 | Bramlett | 428/116 X |
| 4,372,717 | 2/1983 | Sewell et al. | 428/116 X |
| 4,485,568 | 12/1984 | Landi et al. | 428/116 X |
| 4,677,012 | 6/1987 | Anderson | 428/116 |
| 4,865,889 | 9/1989 | Boyse | 410/154 X |
| 4,871,006 | 10/1989 | Kao et al. | 428/116 X |

Primary Examiner—Henry F. Epstein
Attorney, Agent, or Firm—Lothrop & West

[57] ABSTRACT

A dunnage device expandable from a compact flat stack into a vertically extending cellular slab. A plurality of elongated strips is stacked and assembled in co-extensive relation. Each strip has a median portion, opposing end portions, and opposing outer end extremities. A transverse fold line is provided between the median portion and each end portion, across each strip. The strips are attached to each other at their outer end extremities to form pairs; the pairs are attached to each other along adjacent median portions. When the stack of attached strips is expanded, a plurality of serially connected, horizontally oriented, rectangular cells is formed. Means for suspending the cellular slab is disclosed. A foldable, integral backing board, in combination with the cellular slab, is also disclosed.

13 Claims, 3 Drawing Sheets

DUNNAGE DEVICE

CROSS-REFERENCE TO RELATED APPLICATIONS

The applicant herein has a co-pending design patent application, Ser. No. 07/531,804, filed Jun. 1, 1990, entitled "Dunnage Device", which discloses an article relating to the subject matter of the present invention.

BACKGROUND OF THE INVENTION

The invention relates generally to the field of dunnage devices, or void fillers, designed for use within shipping containers or transport vehicles. Such devices are used in conjunction with the packages, boxes, or pallet loads being shipped, so that the loaded goods and the dunnage devices substantially fill the volume of the transport vehicle. In this manner, potentially damaging shifting or toppling of the load into adjacent voids is avoided during transit.

More particularly, the invention pertains to dunnage devices constructed preferably from strips of corrugated paperboard. The strips are configured and assembled to be expandable from a compact flat stack into a vertically extending, cellular slab, adapted to resist compressive forces applied against the major faces of the slab. A hanging device, either resting over the load or attached to an adjacent wall, is typically used to suspend and maintain the slab in an expanded condition.

Representative of such a prior art dunnage device is the cellular void filler shown in U.S. Pat. No. 4,372,717, issued to Sewell et al. The device illustrated in the '717 Patent forms a "honeycomb" slab, including a plurality of generally square and diamond shaped cells, when expanded. Such a void filler is particularly useful when employed with a pallet load having individual boxes or cases, as the slab face of the filler has relatively small cells, presenting many support and contact edges for the plurality of boxes. Honeycomb void fillers are also relatively strong, owing to the fairly high percentage of exposed corrugated material within the face of the slab. Thus, honeycomb void fillers are suitably adapted for applications where large fore and aft stresses are encountered during transit, and imposed upon the slab.

However, other applications exist where the pallet load is formed by a plurality of individual containers, or packages, about which a resilient film has been stretch or shrunk-wrapped. In this instance, the film-wrapped pallet, composed of individual packages, is transformed into a unitary load which does not require abutting support and restraint of each container during transit. In other words, the stretch-wrap material acts to hold the individual containers together as a unit, so the void filler is only called upon to support and restrain the entire unit. This allows the use of a void filler having much larger cells, and requiring less corrugated paperboard material to fabricate.

There are also applications where the stresses or forces imposed upon the void fillers are relatively light, either as a consequence of the nature of the load, or because only lateral, swaying forces are to be restrained. It is for these applications, where the need exists for a less expensive, and lighter duty void filler.

SUMMARY OF THE INVENTION

The cellular dunnage device of the present invention includes a plurality of elongated strips, stacked and assembled in co-extensive relation. Each strip has a median portion with elongated opposing side edges opposing end portions, and opposing outer end extremities. A transverse fold line is provided between the median portion and each end portion, across each strip.

The stacked strips are attached to respective adjacent strips in alternating fashion. For example, a first strip is attached to an adjacent second strip at the respective outer end extremities of their respective end portions. Then, the second strip is attached to an adjacent third strip, along their adjacent median portions. Finally, the outer end extremities of the third strip are attached to the respective outer end extremities of a fourth strip. Additional strips may be similarly stacked and alternatively attached until an assembled stack of the desired number of strips is attained.

A hanging or suspension device is usually attached to the first strip, outermost to the stack. This suspension device may be a large rectangular sheet of corrugated paperboard, having overhang portions extending past the elongated edges of the strips. The outer, median portion of the first strip is attached by glue, or other means, to the underside of the sheet.

Prior to use, the assembled stacked sheets and the attached suspension device form a compact, collapsed stack, readily stored and shipped. In anticipation of using the dunnage device, a worker grasps the suspension device, immobilizes the lowermost strip, and pulls the suspension device away from the stationary strip. This action expands the stack of strips to form a plurality of generally rectangular open sided cells, defined in elongated top and bottom aspects by the median portions of the strips. The corners of the rectangular cells are established by the strip fold lines, and the transverse end aspect of the cells is defined by the end portions of the strips. The expanded dunnage device thus forms a cellular slab, adapted to resist compressive forces applied against the major faces of the slab.

The expanded dunnage device is then lifted into place, between two loads, or between a load and the adjacent sidewall of the container or transport van. The overhang portions of the suspension device either rest over the top of the loads, or have one portion over the load and another portion sometimes attached to the container sidewall. The suspension device thus effectively maintains the dunnage device in an expanded condition and in the desired location, throughout the duration of the container's conveyance.

DETAILED DESCRIPTION OF THE PREFERRED EMBODIMENT

The dunnage device 10, or void filler, includes a plurality of elongated strips 11, preferably constructed from corrugated paperboard, or a functionally equivalent sheet material. The flutes (not shown) of the strips are transversely oriented to the planar major faces 12 of the device, so as to maximize the ability of the device 10 to resist compressive forces imposed thereon.

Figure 1:
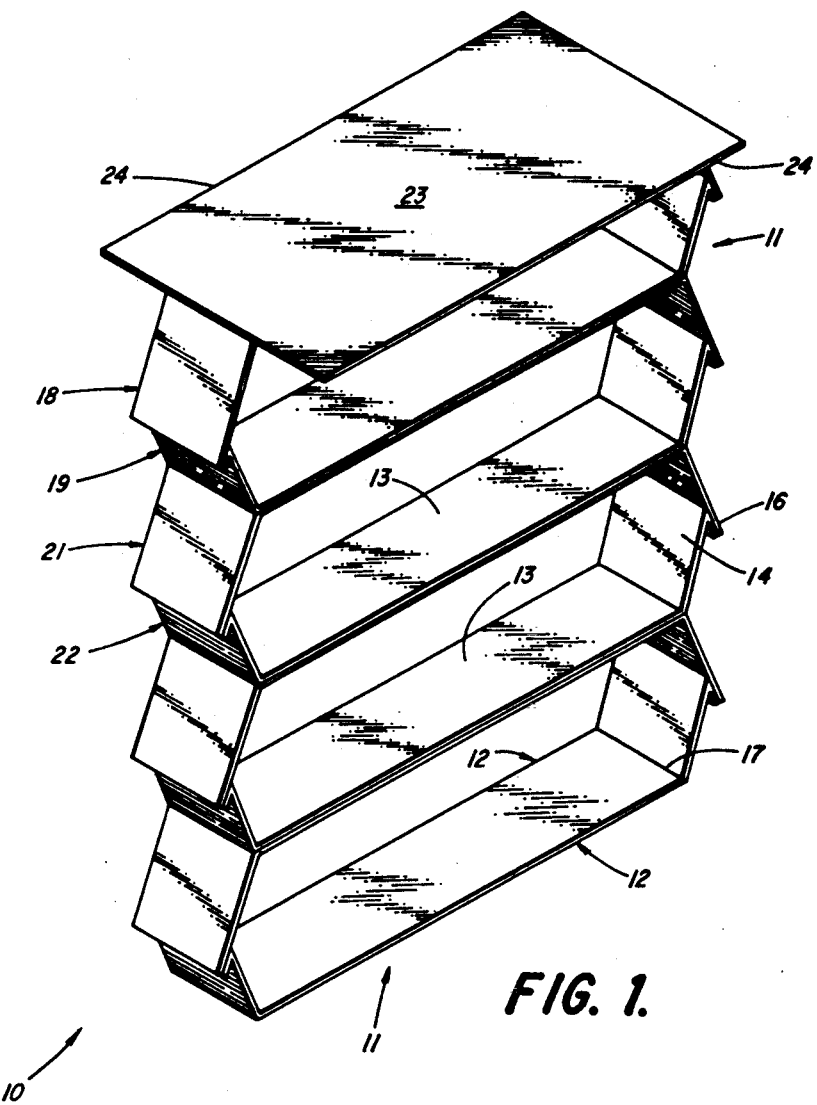
FIG. 1 is a left front perspective of the dunnage device of the present invention, shown in a fully expanded condition.

Each strip 11 has a median portion 13 with elongated opposing side edges 15 opposing end portions 14, and opposing outer end extremities 16. Opposing edges 12, located on a respective side of the device 10, lie within a respective major face 12, as shown most clearly in FIG. 1. Transverse fold lines 17 are provided between the median portion 13 and each respecting end portion 14. The fold lines may be pre-formed, or simply manufactured as a consequence of expanding the device 10. For example, if the strip material is sheet plastic, it may be desirable to pre-form a fold or hinge line. On the other hand, if corrugated paperboard is used for the sheet material, fold lines are readily created between adjacent flutes when the device is expanded.

The strips 11 are arranged in stacked, co-extensive relationship, and are attached to respectively adjacent strips in alternating fashion. Respective outer end extremities 16 of a first, uppermost strip 18 and a second strip 19 are attached to each other using means appropriate for the strip material. A glue adhesive works well for corrugated paperboard; however, heat, solvent, or mechanical means may be more appropriate for attaching other strip materials. Similarly, the median portions 13 of second strip 19 and a third strip 21 are attached to each other. Repeating the alternating strip attachment steps, the respective outer end extremities 16 of third strip 21 and a fourth strip 22 are attached to each other.

In effect, one step of the attachment process results in the first and second strips 18 and 19, and the third and fourth strips 21 and 22, being attached in pairs. As will be explained below, each of these pairs of strips forms a rectangular cell, when the dunnage device is fully expanded. The alternate, or second step, attaching the median portion of one strip of one pair to the median portion of one strip of an adjacent pair, forms a plurality of serially connected rectangular cells, when the device is fully expanded. This attachment process may be repeated, adding additional pairs of strips in like fashion, to construct a device 10 which, when expanded, will extend to the desired length.

Figure 4:
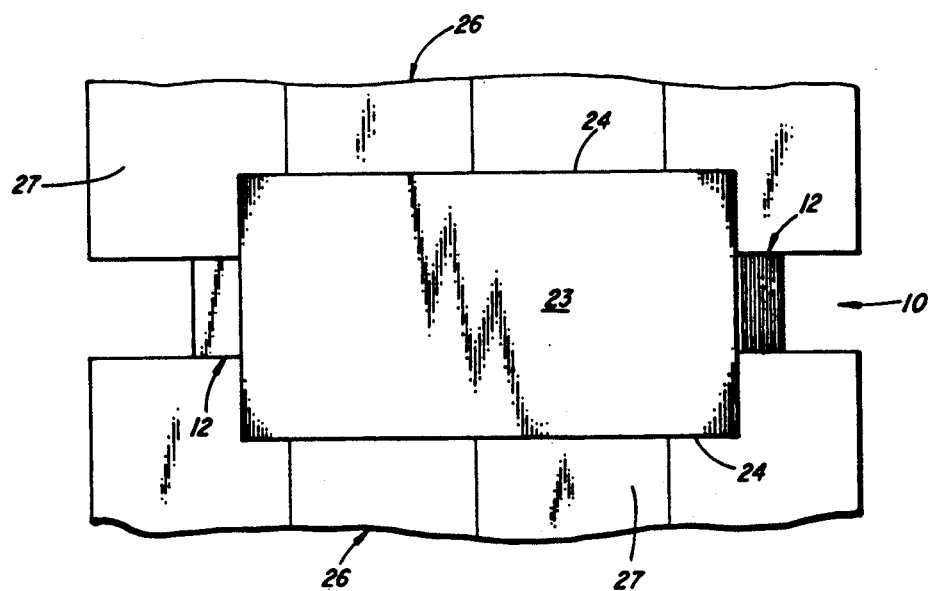
FIG. 4 is a top plan view of the dunnage device shown in conjunction with two adjacent loads.

A hanger 23, or suspension device, is conveniently attached to the upper face of median portion 13 of first strip 18. The hanger 23 may be a piece of sheet material, such as corrugated paperboard, having a length approximately the same as median portion 13, and a width somewhat greater than the transverse dimension of the device 10. As shown most clearly in FIG. 4, overhang portions 24 extend beyond the faces 12 to provide a lip, or extension, to rest over the upper surface of each load 26. If the dunnage device is to be used between a load 26 and the sidewall of a container or van, it may be desirable to bend upwardly, one of the overhang portions 24, so that it can be attached against the vertical sidewall. Other hangers, constructed from rods, sticks, strapping, or other convenient means, may also be used, depending on the application.

Figure 2:
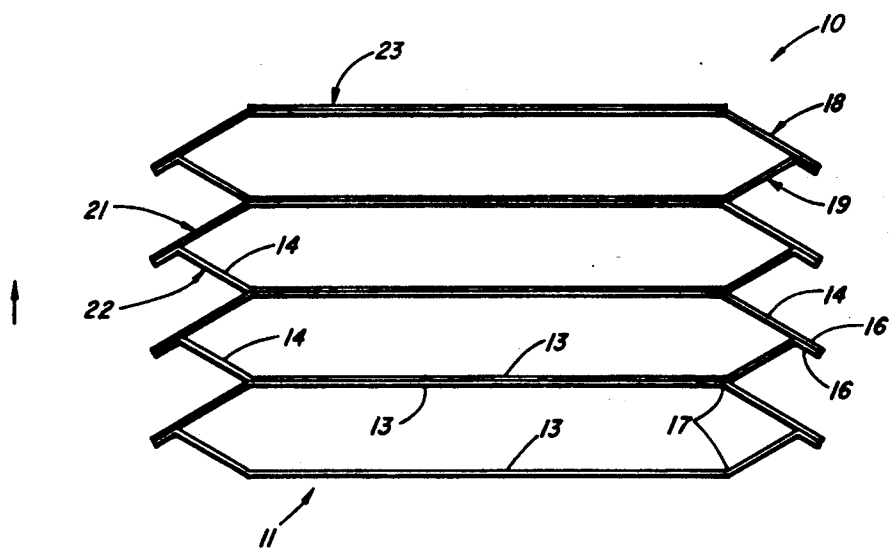
FIG. 2 is an elevational view of the dunnage device, in the process of being expanded from a collapsed stack to a cellular structure.

Following assembly, the device 10 assumes the shape and size of a collapsed stack of paperboard. In this compact configuration, it is easy to store and ship. However, before it can be used, the device must be expanded into a cellular structure, or slab, sufficiently large to fill the existing void between loads, or between a load and the container sidewall. This is readily accomplished by stepping on, or otherwise immobilizing the lowermost strip 11, and then pulling upwardly on the hanger 23. FIG. 2 shows the process in an intermediate stage, before the device is fully extended. During the expansion process, the transverse fold lines 17 allow the end portions 14 to rotate from a horizontal orientation, to a more vertical position.

When the expansion process is completed, the strips 11, attached as described above, form a plurality of serially connected, horizontally oriented, rectangular cells. The connected end portions 14 form the transverse, or short ends of each cell, and the opposing median portions 13 comprise the elongated top and bottom walls of each cell.

Figure 3:
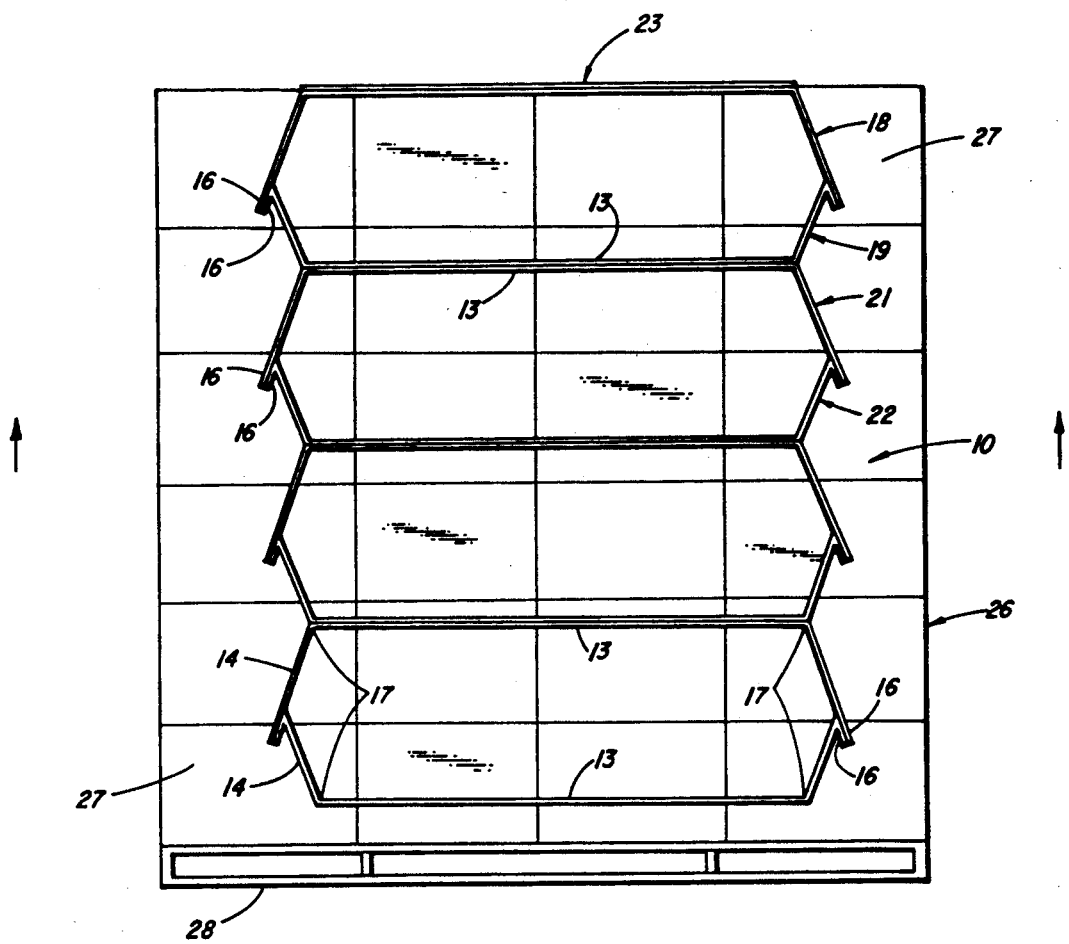
FIG. 3 is an elevational view of a major face of the fully expanded dunnage device, mounted upon a stretch or shrink-wrap, pallet load.

The device 10 is now ready for installation within a container or a transport van, containing a load and at least one void to be filled. As shown in FIG. 3, a stretch or shrink-wrap load 26 is composed of a plurality of boxes 27, stacked and arranged upon a pallet 28. After the boxes are loaded onto the pallet, a shrinkable film (not shown) is repeatedly wrapped around the vertical peripheral wall of the palletized load. Then, heat is applied to the film, which shrinks to form a tight package around the load. Stretch wrapped film is simply wrapped tightly around the palletized load, and does not require the subsequent application of heat.

Since the film holds individual boxes in place, the dunnage device is only called upon to prevent unwanted shifting or swaying of the entire load. Therefore, it is not necessary for the dunnage device to have small structural cells, acting upon and restraining individual boxes. By way of example, FIG. 3 depicts a number of individual boxes which are not directly restrained by dunnage device 10; however, since the film-wrapped pallet acts as a unit, the device 10 is still effective to prevent unwanted shifting or damage to the boxes during transit. Using significantly less material than prior art "honeycomb" dunnage devices, the present invention thus provides an economical alternative for use in the applications discussed above.

Figure 5:
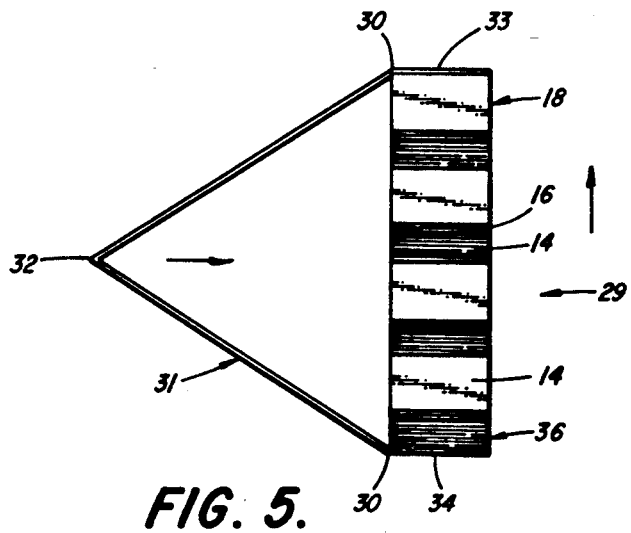
FIG. 5 is a side elevational view of an alternative embodiment of the dunnage device, shown in a partially expanded condition; and, FIG. 6 is a left front perspective view of the device in FIG. 5, but shown in a fully expanded condition.
Figure 6:
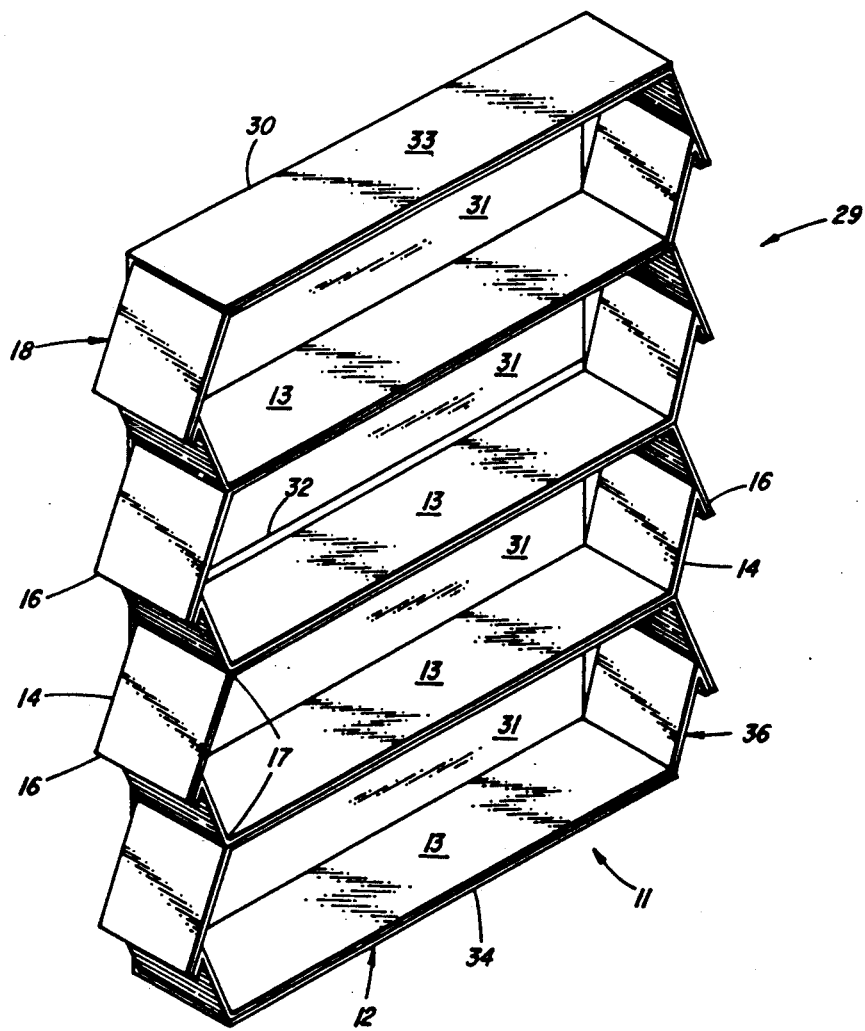

An alternative embodiment of the invention is disclosed in FIGS. 5 and 6. Free-standing dunnage device 29 is constructed in identical fashion as device 10, insofar as the configuration, arrangement, and attachment of the strips 11 are concerned. Therefore, the discussion presented above regarding these aspects of the invention will not be repeated. Also, where identical elements are used in the device 29, the same numerical designations have been used in FIGS. 5 and 6 for simplicity.

The essential feature in device 29 not present in the previously discussed embodiment, is a collapsible, foldable backing board 31, constructed from corrugated paperboard similar to that used for strips 11. The height, or longitudinal extent of board 31 is equal to that of the fully expanded height or extent of device 29. The flute corrugations of the backing board 31 are vertically oriented, so as to provide strength and rigidity when the board is fully extended. Transverse creases are provided in the backing board 31, to allow bending along median fold 32, and along fold lines 30 between board 31, an upper panel 33 and a lower panel 34. Upper panel 33 is attached to the outer, median portion 13 of first uppermost strip 18, and lower panel 34 is attached to the outer median portion 13 of a lowermost strip 36.

As with the device 10, the free-standing dunnage device 29 assumes the configuration of a flat, compact stack after manufacture. It should be noted that median fold 32 allows the backing board 31 to fold into a flat, rearward extension from the assembled strips 11, in their collapsed condition. In preparation for use, device 29 must be manually expanded in a manner similar to that explained above. FIG. 5 shows the device 29 in a partially expanded condition, and includes arrows indicating that for complete expansion, backing board 31 and the stack of strips must be moved accordingly.

When fully expanded, as shown in FIG. 6, backing board 31 performs two primary functions. First, board 31, when aligned in planar relation acts as a suspension device to maintain the device 29 in a fully expanded condition. Since the device 29 is installed within a void having a transverse dimension only slightly larger than that of the device itself, the confines of the adjacent load or wall prevent the backing board from folding up and collapsing the cellular structure Second, board 31 acts more equally to distribute the forces applied against device 29, increasing its resistance to crushing. The use of such a foldable backing board in conjunction with prior art void fillers, is known to provide these same functions. Nevertheless, the backing board can be used to advantage, with the dunnage device of the present invention.

A third ancillary function, provided by the backing board 31, stems from use of the dunnage device 29 in a horizontally extended direction, or orientation. In other words, the device 29 may be laid on its side and extended horizontally, to perform effectively as a low profile void filler. An additional advantage provided by the strips 11, which are vertically oriented in this application, is the superior resistance to sagging or collapse in the middle portion of the cells, compared to "honeycomb" dunnage devices of the prior art used in the same application.

As a further variant to the basic construction disclosed herein, it would be possible to glue, or otherwise attach the edges 15 of the strips 11 to the inner face of the backing board 31, after expansion of the device. This would, in effect, create a rigid bulkhead, for use as a void filler. Also, it is evident that a second backing board could be posited on the other side of the strips 11, to provide additional support and distribution of forces. The second backing board would be attached to the collection of strips in the manner already described, by means of respective second upper and lower panels.

What is claimed is:

1. A dunnage device expandable from a collapsed stack to an extended, cellular structure, comprising:
    a. at least first, second, third, and fourth elongated strips, each of said strips having a median portion with elongated opposing side edges, opposing end portions, and opposing outer end extremities, and including transverse fold lines between said median portion and a respective said end portion, said strips being arranged in stacked, co-extensive relation and assembled so that respective outer end extremities of said first and second strips are attached, adjacent median portions of said second end third strips are attached, and respective outer end extremities of said third and fourth strips are attached; and,
    b. means attached to said first strip, for suspending the dunnage device in an expanded condition, in which said stacked strips form a pair of generally rectangular open-sided cells, defined in elongated top and bottom aspects by said median portions of said strips, having corners established by said strip fold lines, and having transverse end aspects defined by said end portions of said strips.

2. A dunnage device as in claim 1 in which said suspension means comprises a piece of sheet material, attached to said median portion of said first strip and having a transverse dimension slightly greater than that of the cellular structure.

3. A dunnage device as in claim 1 in which said strips are constructed from corrugated paperboard, said paperboard having flutes oriented along said transverse fold lines.

4. A dunnage device as in claim 1 in which said strips are constructed from plastic, and said fold lines are pre-formed before expansion of the device.

5. A free standing dunnage device expandable from a collapsed stack to an extended, cellular structure, for installation with a void having a transverse dimension slightly greater than that of the cellular structure comprising:
    a. at least first, second, third, and fourth elongated strips, each of said strips having a median portion with elongated opposing side edges, opposing end portions, and opposing outer end extremities, and including transverse fold lines between said median portion and a respective said end portion, said strips being arranged in stacked, co-extensive relation and assembled so that respective outer end extremities of said first and second strips are attached, adjacent median portions of said second and third strips are attached, and respective outer end extremities of said third and fourth strips are attached; and,
    b. a backing board, said backing board having two ends and a median transverse fold therebetween and having a longitudinal extent substantially equal to the extended length of the dunnage device, said backing board further including means for attaching one of said ends to said first strip and the other of said ends to said fourth strip, said backing board being expandable with said stacked strips so as to form a pair of generally rectangular cells, open on one side and closed on the other by said backing board, said cells further being defined in elongated top and bottom aspects by said median portions of said strips, having corners established by said strip fold lines, and having transverse end aspects defined by said end portions of said strips.

6. A dunnage device expandable from a collapsed stack to an extended cellular structure, comprising:
    a. a pair of elongated strips, each of said strips having a median portion with elongated opposing side edges, opposing end portions, and opposing outer end extremities, and including transverse fold lines between said median portion and a respective said end portion, said strips being arranged in stacked, co-extensive relation and attached at their respective outer end extremities;
    b. a backing board, said backing board having two ends and a median transverse fold therebetween, and having a longitudinal extent substantially equal to the extended length of the dunnage device, said backing board further including means for attaching each said end to a respective one of said elongated strips, so that when fully extended, said stacked strips form a generally rectangular open-sided cell, defined in top and bottom aspects by said median portions of said strips, having corners established by said strip fold lines, and having transverse end aspects defined by said end portions of said strips, and said backing board lies against an adjacent face of said rectangular cell.

7. A dunnage device as in claim 6 in which said strips are constructed from corrugated paperboard, said paperboard having flutes oriented along said transverse fold lines.

8. A dunnage device as in claim 7, in which said backing board is constructed from corrugated paperboard having flutes oriented along said longitudinal extent of said backing board.

9. A dunnage device expandable from a collapsed stack to an extended, cellular structure, comprising:
 a. a plurality of elongated strips, each of said strips having a median portion with elongated opposing side edges, opposing end portions, and opposing end extremities, and including transverse fold lines between said median portion and a respective said end portion, said strips being arranged in stacked, co-extensive relation and assembled in pairs to form a plurality of serially connected cells, each of said pairs of strips being attached at their respective outer end extremities, and said median portion of one strip of each of said pairs being attached to said median portion of one strip of an adjacent pair of strips; and,
 b. means attached to an outermost strip of an end pair of said strips, for suspending the dunnage device in an expanded condition in which said stacked strips form a plurality of generally open-sided cells, defined in elongated top and bottom aspects by said median portions of said strips, having corners established by said strip fold lines, and having transverse end aspects defined by said end portions of said strips.

10. A dunnage device as in claim 9 in which said suspension means comprises a backing board, said backing board having two ends and a median transverse fold line therebetween; and having a longitudinal extent substantially equal to the extended length of the dunnage device, one of said ends being attached to the uppermost strip of said plurality and the other of said ends being attached to the lowermost strip of said plurality, so that when fully extended, said backing board lies against an adjacent face of the cellular structure.

11. A dunnage device as in claim 10 in which said backing board is constructed from corrugated paperboard having flutes oriented along said longitudinal extent of said backing board.

12. A dunnage device as in claim 9 in which said suspension means comprises a piece of sheet material attached to said median portion of said outermost strip and having a transverse dimension slightly greater than that of the cellular structure.

13. A dunnage device as in claim 9 in which said strips are constructed from corrugated paperboard, said paperboard having flutes oriented along said transverse fold lines.

* * * * *